United States Patent
Piirainen et al.

(10) Patent No.: US 6,658,067 B1
(45) Date of Patent: Dec. 2, 2003

(54) DATA TRANSMISSION METHOD AND RADIO SYSTEM

(75) Inventors: Olli Piirainen, Oulu (FI); Kari Niemela, Oulu (FI)

(73) Assignee: Nokia Networks Oy, Espoo (FI)

(*) Notice: Subject to any disclaimer, the term of this patent is extended or adjusted under 35 U.S.C. 154(b) by 0 days.

(21) Appl. No.: 09/508,268

(22) PCT Filed: Jul. 8, 1999

(86) PCT No.: PCT/FI99/00606

§ 371 (c)(1),
(2), (4) Date: Mar. 9, 2000

(87) PCT Pub. No.: WO00/03523

PCT Pub. Date: Jan. 20, 2000

(30) Foreign Application Priority Data

Jul. 10, 1998 (FI) .................................................. 981589

(51) Int. Cl.⁷ ............................................... H04L 27/20
(52) U.S. Cl. ........................................ 375/308; 375/279
(58) Field of Search ................................ 375/308, 269, 375/271, 279, 280, 281, 309

(56) References Cited

U.S. PATENT DOCUMENTS

| | | | |
|---|---|---|---|
| 5,197,061 A | | 3/1993 | Halbert-Lassalle et al. |
| 5,311,545 A | | 5/1994 | Critchlow |
| 5,717,471 A | | 2/1998 | Stewart |
| 5,796,783 A | * | 8/1998 | Crawford .................... 375/298 |
| 5,909,469 A | | 6/1999 | Frodigh et al. |
| 5,960,040 A | | 9/1999 | Cai et al. |
| 6,061,549 A | * | 5/2000 | Labonte et al. ............ 455/67.3 |

FOREIGN PATENT DOCUMENTS

EP 847 169 6/1998

OTHER PUBLICATIONS

"Edge" Enhanced Data Rates for GSM and TDMA/136 Evolution, Anders Furuskar, et al., IEEE Personal Communications, Jun. 1999, pp. 56–66.

* cited by examiner

Primary Examiner—Stephen Chin
Assistant Examiner—Kevin Kim
(74) Attorney, Agent, or Firm—Pillsbury Winthrop LLP

(57) ABSTRACT

The invention relates to a data transmission method and radio system. In particular, the invention relates to a method and system in which both the GMSK and the m-PSK modulation methods are available for the signal to be transmitted an in which the modulation method used at a given time can be changed to another modulation method. In the solution of the invention, the m-PSK modulator of the transmitter includes a multiplier adapted to multiply the signal to be transmitted by a given coefficient making the signal constellations of the received signal similar regardless of the modulation method. Thus, the processing of the signal in the receiver becomes easier and the quality of the transmission improves in connection with m-PSK modulation.

10 Claims, 3 Drawing Sheets

DATA TRANSMISSION METHOD AND RADIO SYSTEM

This application is the national application PCT/FI99/00606 filed Jul. 8, 1999 which designated the U.S.

FIELD OF THE INVENTION

The invention relates to a data transmission method and radio system. In particular, the invention relates to a method and system in which both the GMSK and the m-PSK modulation method are available for the signal to be transmitted and in which the modulation method used at a given time can be changed to another modulation method.

BACKGROUND OF THE INVENTION

In radio telecommunication systems the quality of the channel, i.e. the radio path, varies continuously. Several factors affect the quality of a radio system channel, for instance multipath propagation, fading, interference in the environment and many other matters.

When designing known radio systems, the aim has been to secure the quality of the signal also when the quality of the channel is poor. When designing data transmission systems, an essential parameter is the modulation method used in the transmission path. The information symbols to be transmitted cannot as such be transmitted over the transmission path due to the dissipation occurring in the transmission path and the capacity of the transmission path, and the symbols must be modulated by a suitable method to produce a satisfactory transmission path capacity and transmission quality. When designing known systems, the main focus in selecting the modulation method has been to secure the transmission quality making the performance of the modulation methods in poor channel conditions very important. This is why the ability of current systems to transmit signals having high data rate is rather poor. When securing the quality of the transmission, the capacity has suffered.

An example of known modulation methods is GMSK (Gaussian Minimum Shift Keying), which is used in the GSM (Global System for Mobile Communication) cellular radio system. It has a limited frequency spectrum and its performance is good, but the data transmission rates are not very high. The continuous phase shift keying methods m-PSK make it possible to attain high data rates, but the modulation method works well only when the transmission channel does not have much interference, i.e. the signal-to-noise ratio is good.

One solution for optimizing performance and transmission rate is to change the modulation method used according to current needs. The GMSK method can be used when good interference tolerance is required, and when the channel quality is good, for instance the 8-PSK method can be used to achieve three times as fast a data rate as compared with GMSK.

The problem with known radio systems is how to change the modulation method seamlessly during an ongoing connection. Change of modulation method causes problems especially in the receiver, because the transmitter can change its modulation method without notifying the receiver in advance. A seamless change of modulation method is, however, needed in packet switched data transmission, for instance.

Therefore, when using the GMSK and PSK methods, the receiver must when receiving a signal check and decide which of the modulation methods has been used in sending the signal. As the modulation method can change without prior notice, this checking of modulation method is a continuous operation, and the easier it is done, the better. Previously, the decision on the modulation method used was made on the basis of the training sequence of each frame. As the signal constellation of a received GMSK signal rotates in the receiver, the rotation must be removed before detection. The signal constellation of a PSK signal does not rotate in the receiver, so the signals must be treated in different ways before channel estimation. This causes problems, because before channel estimation the receiver does not know the modulation method used.

BRIEF DESCRIPTION OF THE INVENTION

Thus, the object of the invention is to implement a method and a radio system implementing the method in a manner that the above-mentioned problems are solved. This way, the receiver can effectively demodulate and detect the transmitted signal even though it does not know the modulation method of the transmitter in advance. This is achieved by the data transmission method of the invention, in which method both the GMSK and the m-PSK modulation method are available for the signal to be transmitted and the modulation method used at a given time can be changed to another modulation method. In the method of the invention, when using the m-PSK modulation method, the signal is multiplied by a given coefficient making the received signal constellations similar regardless of the modulation method.

A further object of the invention is a radio system comprising a set of transmitters and receivers, of which transmitters at least some comprise both a GMSK modulator and a m-PSK modulator to modulate the signal and a control unit adapted to select the modulation method used at a given time. In the system of the invention, the m-PSK modulator of the transmitter comprises a multiplier adapted to multiply the signal to be transmitted by a given coefficient which makes the signal constellations of the received signal similar regardless of the modulation method.

The method and system of the invention provide several advantages. Different modulation methods can be seamlessly combined in the solution of the invention, because the signals transmitted by different modulation methods can be treated in the same way before channel estimation.

In a preferred embodiment of the invention, the m-PSK signal to be transmitted is multiplied by a coefficient which makes the signal constellation in the receiver rotate in the same way as the constellation of a GMSK-modulated signal. With the solution of the invention one disadvantage of the PSK modulation method is avoided, which occurs when the data to be transmitted contains only zero bits. In such a case, the modulated signal comprises only the carrier wave, but in the solution of the invention, this situation is avoided due to the rotation of the constellation.

BRIEF DESCRIPTION OF THE DRAWINGS

In the following, the invention will be described in greater detail in connection with preferred embodiments and with reference to the attached drawings, in which.

DETAILED DESCRIPTION OF THE INVENTION

Figure 1:
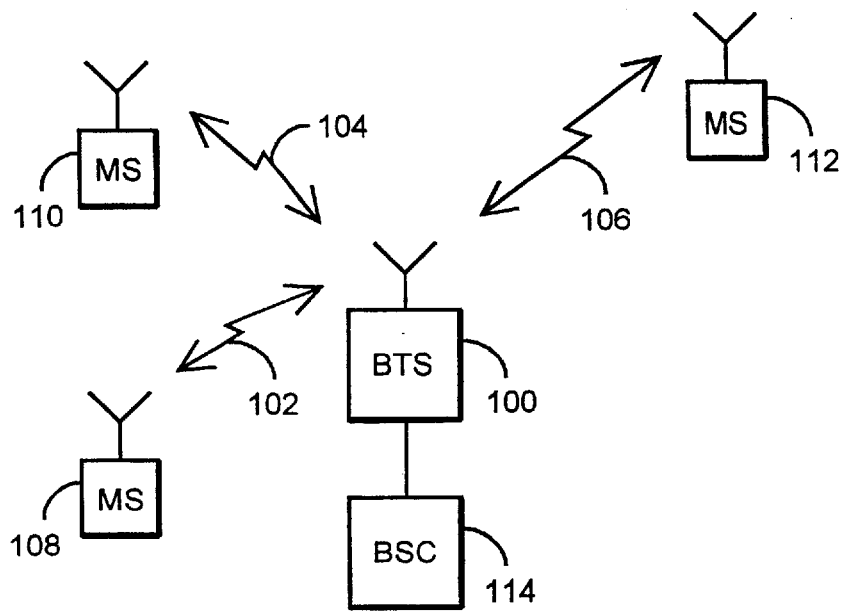
FIG. 1 shows an example of a radio system of the invention.

FIG. 1 illustrates a digital data transmission system to which the solution of the invention can be applied. The system in question is a part of a cellular radio system which comprises a base station 100 which has a bi-directional connection 102 to 106 to subscriber terminals 108 to 112. Further, the base station has a connection to a base station controller 114 which switches the connections of the terminals elsewhere in the network. Both the GMSK and the m-PSK modulation methods are available for the terminals and the base station of the system, or at least a part of this equipment. The modulation method used in a given situation at a given time can be changed to another modulation method. With poor signal-to-noise ratio, the GMSK method can be used and when the transmission path allows it, the 8-PSK method, for instance. EDGE, i.e. a further developed system of the digital GSM cellular radio system, is a good example of a system of the invention. However, the invention is not limited to it, as is obvious to those skilled in the art. The invention can also be used in other systems.

Let us next examine an example of the structure of a transmitter in a system of the invention. Here, the structure of a subscriber terminal 108 is presented. Corresponding components are also substantially found in a transceiver of a base station, as is obvious to those skilled in the art. In the receiving direction, a signal received by an antenna 200 is forwarded to a duplex filter 202 which separates the frequencies used in transmission and reception from each other. From the duplex filter 202, the signal is forwarded to radio frequency parts 204 in which the signal is converted to an intermediate frequency or directly to a base band, and the thus converted signal is sampled and quantized in an analogue/digital converter 206. From the converter, the signal is forwarded to an equalizer 208 which compensates interference, such as that caused by multipath propagation. The modulation is demodulated in a demodulator 210, i.e. a bit stream is extracted from the equalized signal and forwarded to a demultiplexer 212. The demultiplexer 212 separates the bit stream from different time-slots into their own logical channels. From the demultiplexer, the signal is forwarded to de-interleaving and decipherment 213. After this, a channel codec 214 decodes the bit stream of different logical channels, i.e. decides whether the bit stream is signalling data to be forwarded to a control unit 216, or speech to be forwarded to a speech codec 218 Which decodes speech coding. From the speech codec, the signal is forwarded on to a loudspeaker 220. The channel codec 214 also corrects errors. The control unit 216 performs internal control tasks by controlling various units.

In the transmitting direction, the signal is forwarded from a microphone 222 to the speech codec 218 which does speech coding. From the speech codec, the signal is forwarded to the channel codec 214 which does channel coding. The data coming out from the channel codec 214 is interleaved and enciphered 219. After this, the signal is forwarded to a burst builder 224 which forms the burst to be transmitted for instance by adding a training sequence and tail bits to the data coming from the channel codec 218. A multiplexer 226 indicates a time-slot for each burst. A modulator 228 modulates the digital signals to a radio frequency carrier. This is described in greater detail later on in the document. The modulated signal is forwarded to a radio frequency transmitter unit 230 in which the signal is filtered before transmission, i.e. the bandwidth of the signal is limited to a required area, and after the filtering the signal is transmitted through the duplex filter 202 by means of the antenna 200. The transmitter 230 also controls the output power of the transmission. A synthetizer 232 arranges the necessary frequencies for the various units.

The presented equipment can also comprise other components, such as adapters and filters, as is obvious to those skilled in the art.

Let us next examine more closely the operation of the modulator 228. In the following, 8-PSK is used as an example of m-PSK. However, the invention is not limited to it, as is obvious to those skilled in the art.

Figure 3:
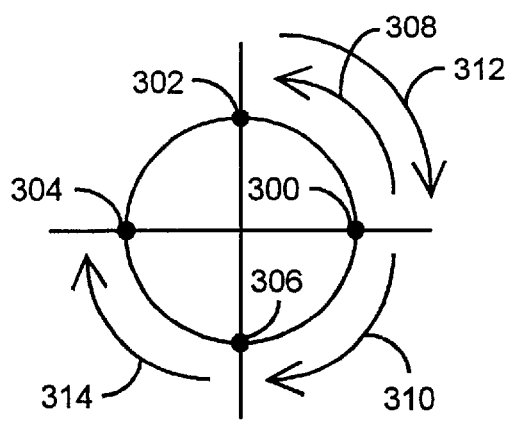
FIG. 3 illustrates a signal constellation of the GMSK modulation method.

FIG. 3 illustrates a signal constellation of a received signal when the signal has been transmitted by the GMSK modulation method. In principle, the constellation comprises four points 300, 302, 304 and 306. Let us assume that we are in point 300. GMSK uses differential coding, i.e. the direction of movement in the constellation varies depending on whether the bit is the same as or different than the previous one. If the bit is the same (0→0 or 1→1), the direction of movement in the constellation is counterclockwise, i.e. offset 308 is performed. If the bit is different (0→1 or 1→0), the direction of movement in the constellation is clockwise, i.e. offset 310 is performed. Because in GMSK the aim is to collect the points into two different clusters, for instance 300 and 304, to minimize errors, the signal is, in addition to the previous operation, multiplied by $e^{-jk\pi/4}$, where k is a bit index which depends on the location of the bit in the frame. This causes the constellation to rotate clockwise, i.e. in the above example, the offset 308 is followed by offset 312, i.e. the point stays the same. Correspondingly, offset 310 is followed by offset 314, i.e. we move to point 304.

Figure 4:
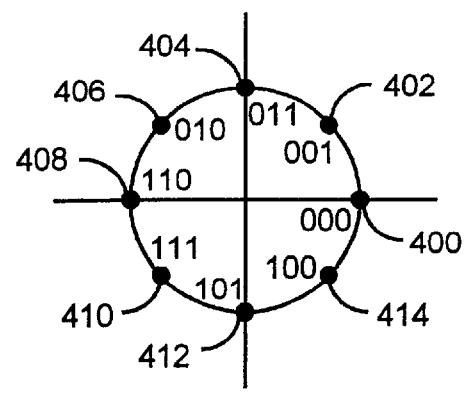
FIG. 4 illustrates a signal constellation of the 8-PSK modulation method.
Figure 2:
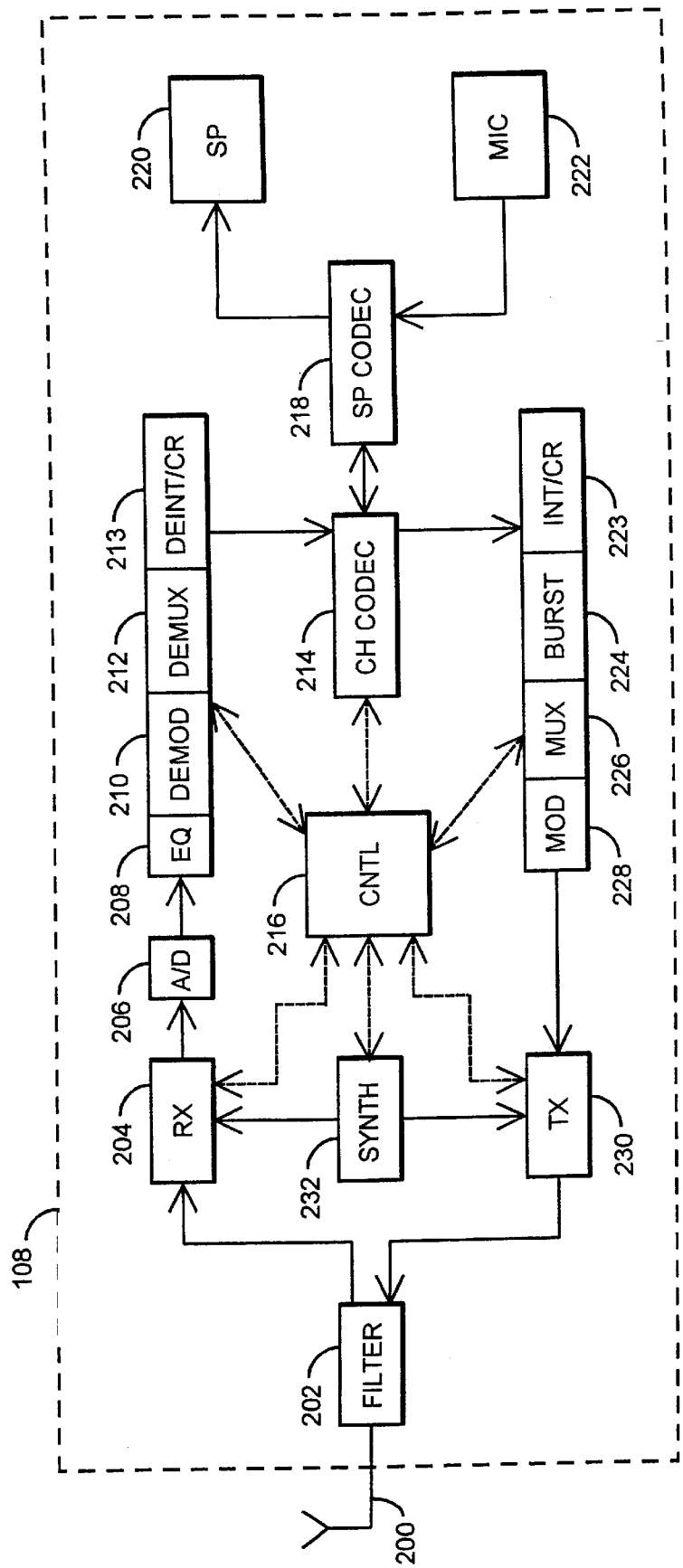
FIG. 2 illustrates the structure of a transceiver.

FIG. 4 illustrates a signal constellation of a received signal when the signal has been transmitted by the 8-PSK modulation method. The constellation comprises eight points 400, 402, 404, 406, 408, 410, 412 and 414. Eight points corresponding to the eight symbols transmitted in 8-PSK. Each symbol comprises three bits which are Gray-coded so that the bit combinations of adjacent points always differ from each other by one bit. A possible coding is illustrated in the figure by the marked bit combinations.

Figure 5:
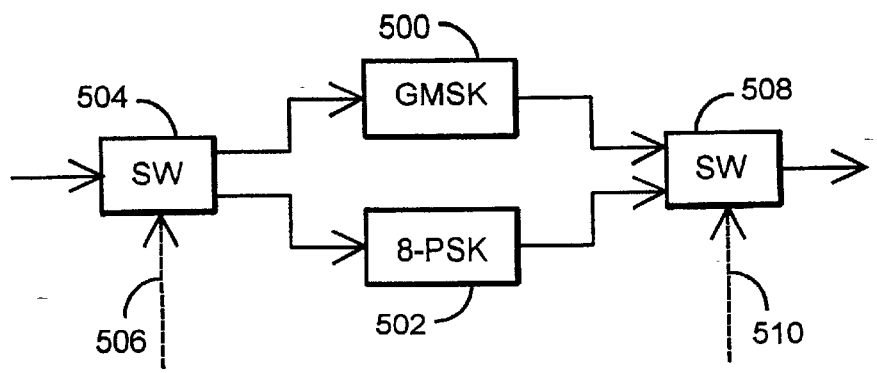
FIG. 5 illustrates the structure of a modulator.

Let us examine the solution of the invention by means of the modulator block diagram in FIG. 5. The transmitter can, when necessary, change modulation method. The transmitter of the invention comprises both a GMSK modulator 500 and a PSK modulator 502. The signal to be transmitted is forwarded to a first switch 504 in the modulator. The switch has two positions. In one position, the switch 504 switches the signal to the GMSK modulator. In the other position, the switch switches the signal to the PSK modulator. The switch receives a control signal 506 from the control unit of the transmitter (not shown). The outputs of the modulators are forwarded to another switch 508 which also has two positions. The second switch 508 is synchronized to the first switch 504 so that if the first switch has switched the signal to a certain modulator, also the second switch switches the signal path to that modulator. The second switch, too, receives a control signal 510 from the control unit of the transmitter (not shown). From the second switch 508, the signal is forwarded on to the radio frequency parts.

Figure 6:
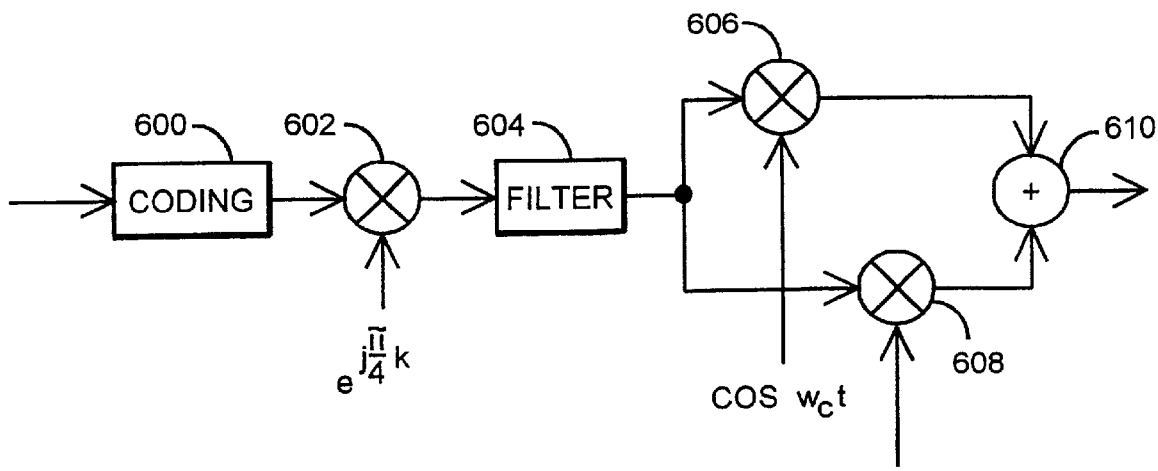
FIG. 6 illustrates the structure of a PSK modulator.

In the transmitter of the invention, the GMSK modulator 500 can be implemented in a manner known to those skilled in the art. FIG. 6 illustrates the structure of the PSK modulator.

Let us mark the 8-PSK symbol to be transmitted with the letter S, where S can obtain values [0, 1, . . . , 7]. The modulator comprises a coder 600 in which the bits to be transmitted are first mapped as symbol S, i.e. S=Map(B2, B1, B0), where B0, B1 and B3 are three adjacent bits to be transmitted. After this, the symbol is forwarded to a multiplier 602 in which it is multiplied by the term $e^{-jk\pi/4}$, where k is a bit index which depends on the location of the bit in the frame. Information concerning the bit index k is sent to the multiplier by the control unit of the transmitter (not shown in this figure). The multiplication causes the rotation of the constellation. When examining FIG. 4, let us assume for instance that three adjacent bits corresponding to the symbol 404 must be transmitted after the symbol 400. First the symbol 404 is mapped and then multiplied by the term $e^{-jk\pi/4}$, which causes a 90° rotation clockwise. This takes us to point 400 which is then transmitted. Correspondingly, if the three adjacent bits to be transmitted corresponded to the symbol 400, the rotation would result to transmitting the symbol 412.

After the multiplier 602, the signal can be presented in the form $P=e^{-jk\pi/4}e^{-jk\pi/4}$, where S is the symbol to be transmitted. From the multiplier 602, the signal is forwarded to a filter 604 in which filtering according to Gaussian distribution is preferably performed. From the filter, the signal is forwarded to a second and third multiplier 606, 608 in which the signal is multiplied to radio frequency $w_c$. The signal components are combined in an adder 610 and forwarded on to the radio frequency parts.

Figure 7:
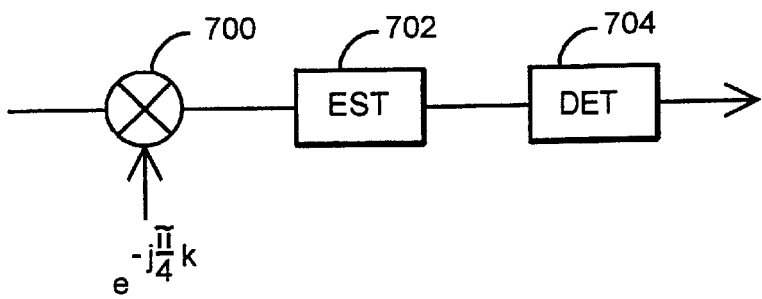
FIG. 7 illustrates the structure of a demodulator.

Let us yet examine the structure of the demodulator in the receiver by means of the block diagram in FIG. 7. Certain advantages of the solution of the invention are displayed in the structure of the receiver. The demodulator comprises a multiplier 700 in which the received signal is multiplied by the term $e^{-jk\pi/4}$. This multiplication removes the rotation of the signal constellation. From the multiplier, the signal is forwarded to an estimator 702 in which the impulse response is estimated and in which the modulation method used can be decided. From the estimator, the signal is forwarded to a detector 704 which is preferably a Viterbi detector, for instance. In the solution of the invention, the signal can be processed in a similar way regardless of the modulation method used. Without the solution of the invention, the signal must before the multiplier be branched to another branch in which the signal is processed without removing the rotation. The elimination of this branch simplifies the implementation of the receiver.

Even though the invention has been explained in the above with reference to examples in accordance with the attached drawings, it is obvious that the invention is not restricted to them but can be modified in many ways within the scope of the inventive idea disclosed in the attached claims.

What is claimed is:

1. A data transmission method in which both GMSK and m-PSK modulation methods are available for a signal and wherein the modulation method used at a given time can be changed to another modulation method, the method comprising:

when using the m-PSK modulation method, multiplying the signal by a given coefficient thus making signal constellations similar regardless of the modulation method such that a receiver can process the signal in a similar way regardless of the modulation method.

2. A method as claimed in claim 1, wherein the signal to be transmitted comprises bursts formed by several bits and that the coefficient given depends on bit location in the burst.

3. A method as claimed in claim 1, wherein the signal to be transmitted comprises bursts formed by several bits and that the signal to be transmitted is multiplied by a coefficient $e^{-jk\pi/4}$, where k is a bit index.

4. A method as claimed in claim 2, further comprising multiplying the signal to be transmitted by a coefficient which makes the signal constellation rotate in the receiver like the constellation of a GMSK-modulated signal.

5. A method as claimed in claim 1, wherein the modulation method can be changed to another modulation method without the receiver knowing it.

6. A method as claimed in claim 1, wherein the method is applied to a cellular radio system.

7. A radio system comprising:

a set of receivers configured to receive a signal to be transmitted;

a set of transmitters configured to transmit the signal; at least some of which comprise both a GMSK modulator and a m-PSK modulator to modulate the signal and a control unit adapted to select the modulation method used at a given time, wherein the m-PSK modulator of respective transmitters comprise a multiplier adapted to multiply the signal to be transmitted by a given coefficient which makes the signal constellations of the received signal similar regardless of the modulation method such that at least one receiver of said set of receivers can process the signal in a similar way regardless of the modulation method.

8. A system as claimed in claim 7, wherein the signal to be transmitted comprises bursts formed of several bits and the multiplier is adapted to multiply the signal to be transmitted by a coefficient $e^{-jk\pi/4}$, where k is a bit index.

9. A system as claimed in claim 8, wherein the signal to be transmitted comprises bursts formed of several bits and the multiplier is adapted to multiply the signal to be transmitted by a coefficient making the signal constellation rotate in the at least one receiver like a constellation of a GMSK-modulated signal.

10. A system as claimed in claim 7, wherein the radio system is a cellular radio system.

* * * * *